United States Patent [19]

Kunz

[11] Patent Number: 4,992,284

[45] Date of Patent: Feb. 12, 1991

[54] MICROWAVE FOOD AROMA COMPOSITION

[75] Inventor: Gordon F. Kunz, Mahwah, N.J.

[73] Assignee: Kraft General Foods, Inc., Glenview, Ill.

[21] Appl. No.: 427,263

[22] Filed: Oct. 25, 1989

[51] Int. Cl.$^5$ ............................................... A23L 1/00
[52] U.S. Cl. .................................... 426/241; 426/243; 426/305; 426/602; 426/650
[58] Field of Search ............... 426/241, 243, 305, 307, 426/602, 89, 650

[56] References Cited

U.S. PATENT DOCUMENTS 4,518,618 5/1985 Hsia et al. ........................... 426/243

FOREIGN PATENT DOCUMENTS 0285196 10/1988 European Pat. Off. ............ 426/305

*Primary Examiner*—George Yeung
*Attorney, Agent, or Firm*—Thomas A. Marcoux; Thomas R. Savoie; Linn I. Grim

[57] ABSTRACT

The invention relates to a composition for producing an aroma upon exposure to microwave radiation. The composition comprises food acceptable salts in an amount of from 0.5 to 5% by weight of the composition, milk solids in an amount of from 5 to 25%, lipid in an amount of from 5 to 35%, water in an amount of from 30 to 70% and an effective amount of an aroma source which upon exposure of the composition to microwave radiation will produce an aroma. Preferably the composition is topically coated on a comestible and upon exposure to microwave radiation an aroma will be produced within one minute, preferably from 15 to 30 seconds. The composition after aroma release will not impart an objectionable taste to the cooked or reheated comestible upon ingestion by a consumer.

11 Claims, No Drawings

MICROWAVE FOOD AROMA COMPOSITION

BACKGROUND OF THE INVENTION

1. Field of the Invention

This invention relates to the microwave preparation of food. More particularly, it relates to the release of food aromas during the microwave preparation of food. This invention especially relates to compositions which will release aromas of cooking food during microwave preparation of comestibles.

2. Description of the Prior Art

Microwave ovens for home use have found widespread acceptance. The fact that the cooking and/or reheating of food in the domestic microwave oven is achieved in such relatively short periods of time is probably the principal reason for the high sales of these units in recent years.

Essentially all domestic microwave ovens operate at 2450 MHz. The dielectric properties of food at this frequency parallels those of water which is the principal lossy constituent of food. The absorption of microwave energy by food by the interaction of the dipole water molecule in the microwave field results in a localized heating resulting in the desired cooking or reheating. Despite the widespread use of microwave ovens, a major shortcoming involved in their use is the lack of desirable aroma release from comestibles during their preparation by microwave heating. The reason for this may be attributed to the basic functioning of the microwave oven. Since the action of microwave energy on the dipole water molecule is the principal cause of heat generation within the water-containing comestible, the maximum temperature obtainable on a comestible surface exposed to microwave energy is about 100° C. In a thermal oven, normal cooking and roasting temperatures are in the range of about 175° to about 235° C. (350°-450° F.). Further, the short cooking times achieved by using a microwave oven may also contribute to the lack of aroma generation from the comestible. It is thought that the combination of temperatures in excess of 100° C. and periods of time in excess of about 5 minutes are necessary for the typical generation and release of the familiar roasting or cooking aromas. Thus, the very features of the microwave oven which make it so attractive to people anxious to quickly prepare a tasty meal, prevent the generation of kitchen aromas which would be harbingers of the upcoming meal.

The generation or release of aromas from comestibles being prepared in a microwave oven would enhance the usefulness of this appliance, as well as, increasing the acceptance of microwaveable convenience foods provided with an appropriate aroma-releasing composition.

Recently in U.S. Pat. No. 4,857,340 to T. Parliment et al. entitled Aroma Release During Microwave Cooking a composition of an aroma-producing material was taught which comprises an aroma-producing material enrobed in a lipid in combination with a microwave susceptible material. Upon exposure to microwave radiation, the rapid heat generated by the microwave susceptible material would melt the lipid thereby releasing the aroma. The microwave susceptible material could be a solid such as a heater board or it could be a liquid such as glycerol or propylene glycol which could be admixed with the aroma and lipid. However the microwave susceptible liquids may not be appropriate to be topically applied to a food product because they may contribute an off-flavor to the food on which they are applied.

It is an object of this invention to provide aroma production during microwave preparation of comestibles.

It is another object of the invention to provide aroma-producing compositions for use when comestibles are prepared in a microwave oven, preferably a composition which may be topically applied to the comestible without contributing an off-flavor to the comestible after cooking or reheating.

SUMMARY OF THE INVENTION

In accordance with the present invention, it has been found that microwave cooking can be made pleasant and enjoyable by including, in the microwaveable package of a comestible, an aroma-producing composition which, upon being subjected to microwave energy, releases an aroma which people associate with the cooking of the particular comestible. Specifically, the invention relates to a composition for producing an aroma upon exposure to microwave radiation comprising:

| food acceptable salts | 0.5 to 5% |
|---|---|
| milk solids | 5 to 25% |
| lipid | 5 to 35% |
| water | 30 to 70% |

The composition is an oil in water emulsion or suspension which contains an effective amount of an aroma or flavor source which upon exposure to microwave radiation will produce an aroma within a short period of time. The combination of ingredients above acts to quickly generate heat which causes the aroma or flavor to be driven off. The aroma will be produced within a period of time less than one minute after exposure to microwave radiation. The composition may be topically applied to a food product and will not impart an objectional taste to the cooked or reheated food after the aroma has been produced.

Also disclosed is a process for producing an aroma in a microwave oven which comprises:
(a) forming an emulsion or suspension by admixing a composition comprising:
food acceptable salts from 0.5 to 5% by weight of the composition, milk solids from 5 to 25% by weight of the composition, lipid from 5 to 35% of the composition, water from 30 to 70% by weight of the composition and a sufficient quantity of an aroma source which when exposed in the composition to microwave energy will produce an aroma;
(b) coating the composition onto a comestible; and
(c) heating the comestible in a microwave oven for a period of time effective to generate an aroma.

DESCRIPTION OF THE PREFERRED EMBODIMENTS

The present invention relates to providing aromas when comestibles are prepared in a microwave oven either when the comestible is being cooked or when a precooked comestible is being reheated. In many situations, the preparation time in a microwave oven for a given comestible is too short for the comestible to generate and release the normal aromas associated with its cooking. Therefore, any aroma composition which may be employed to provide the usual cooking aromas and which requires heat to release its aroma must be produced quickly in order to generate the required aroma within the short-term microwave preparation process.

In accordance with the present invention, a composition is provided which generates an aroma when it is subjected to microwave radiation.

The table below sets forth the ingredients which comprise the aroma composition expressed as a percentage by weight of the composition as a broad and preferred range:

| Ingredient | Broad Range | Preferred Range |
|---|---|---|
| Food acceptable salt | 0.5 to 5% | 2 to 4% |
| Milk solids | 5 to 25% | 8 to 14% |
| Lipid | 5 to 35% | 17 to 35% |
| Water | 30 to 70% | 37 to 67% |

The aroma composition additionally contains an aroma source in an amount sufficient to generate aromas quickly when the composition is exposed to microwave radiation. The specific amount of aroma source depends on the concentration of the aroma source as well as the strength of the aroma so generated. Typically the aroma source is incorporated into the composition at a level within the range of 0.25 to 20% by weight of the composition.

The aroma composition is prepared by mixing the lipid with oil soluble aroma sources and optionally the emulsifiers and separately mixing the water with milk solids, salt and any water soluble aroma sources. Thereafter the lipid mixture is combined with the water mixture and subjected to sufficient shear or homogenization to create a suspension or emulsion. The aroma composition may then be stored preferably under refrigeration or it may be applied topically to a food product, or to packaging material containing a microwaveable food product. In the preferred embodiment the aroma composition is applied directly onto the food product typically at a use level within the range of 0.5 to 5% by weight of the food product. It is a distinct advantage of the present invention that the aroma composition may be applied directly onto the food product and that after exposure to microwave radiation and production of the aroma, the remaining composition left on the heated food product does not impart a detrimental taste to the product when eaten by the consumer.

The composition will produce its beneficial aroma within one minute upon exposure to microwave radiation in a microwave oven, preferably within 15 to 30 seconds for single serving microwave foods. This rapid production of the aroma is attributable to makeup of the aroma composition which is able to quickly generate an elevated surface temperature in the area where the aroma composition has been applied. Typically, the temperature is elevated from approximately 30° C. to 100° C. within 15 to 30 seconds in the case of exposure of a frozen microwaveable comestible to microwave radiation.

The aroma source in the composition of this invention which produces the aroma may be from a food, ground spice, coffee, etc. which are known to contain volatile aromas. Alternatively, chemicals providing odors associated with the cooking of comestibles may be employed singularly or in combination to provide the desired aroma, which often is a combination of individual odors or aromas. In addition, the desired aroma may be produced from a precursor of an individual chemical which provides the single identifiable odor. Chemicals which provide the desired aromas are well known in the art. Thus, there are chemicals which can provide the aroma of cherries, apples, baking bread, roasting meat, melted butter, popcorn, and the like. Where the comestible being prepared in the microwave oven requires a combination of aromas normally associated with its preparation, a combination of the flavor materials may be employed. The aroma-producing materials are, conventionally, volatile liquids or solids which at slightly elevated temperatures, will volatilize releasing their aroma.

The food acceptable salts to be utilized in the present invention may be any suitable edible salt but will typically comprise a sodium, potassium, calcium or magnesium food acceptable salt. Either a single salt or combinations of salts may be incorporated in the aroma composition. The preferred salts are sodium chloride and potassium chloride. The level of incorporation of the salt is less than or equal to 5% to assure that the aroma composition does not impart an undesirable salty character to the food product onto which the aroma composition is topically applied.

Suitable milk solids which may be incorporated into the aroma composition of the present invention include non-fat dry milk solids (NFDM), milk sugars such as lactose, whey solids, caseinates and/or combinations of these ingredients. The preferred milk solids are lactose and NFDM.

Useful lipids to be incorporated into the aroma composition of the present invention include animal and vegetable fats, butter, mono, di and triglycerides and combinations of these lipids.

Other optional ingredients may also be added to the aroma composition. Food grade emulsifiers such as gum arabic and microcrystalline cellulose may be added to the composition before shearing or homogenization because these ingredients facilitate the formation of an oil in water emulsion and/or formation of a stable colloidal suspension. Typically these ingredients will be added at a level less than 2% by weight of the composition, preferably from 0.75 to 1.5%. Additionally other sugars other than milk sugars, i.e., dextrose may be added.

The following examples illustrate the practice of this invention.

EXAMPLE 1

A microwave aroma-producing composition which produces a macaroni and cheese type aroma upon exposure to microwave radiation was prepared from the following ingredients:

| Ingredient | Percentage |
|---|---|
| Oil Phase | |
| Mazola Corn Oil | 18.0 |
| F & F Natural Parmesan Cheese 115270 | 8.0 |
| McC Natural Cheddar Cheese F47025 | 2.0 |
| FD & O Natural Butter 119822 | 0.54 |
| Water Phase | |
| Water | 50.86 |
| NFDM | 13.0 |
| Salt | 3.0 |
| Natural Cheese Enhancer | 2.0 |
| Artificial Cooked Milk Flavor | 2.0 |
| Dimodan PVK (emulsifier mfg. by Grinstead) | 0.5 |
| Panodan 150 (emulsifier mfg. by Grinstead) | 0.1 |

-continued

| Ingredient | Percentage |
| --- | --- |
| Total | 100.0 |

NOTE:
The above abbreviations correspond to the following companies:
F & F - Fries & Fries, Cincinnati, Ohio
McC - McCormick and Comp. Inc., Hunt Valley, Maryland
FD & O - Fritzsche, Dodge & Olcott, New York, New York
Grinstead, Industrial Airport, Kansas The composition was manufactured as follows: the oil, butter flavor, cheddar flavor and emulsifiers were combined and heated to 160° F. The combination was cooled and the natural parmesan flavor was added. Separately, the water, NFDM, salt, natural cheese enhancer and artificial cooked milk flavor were combined and mixed in a Gifford-Wood Mixer (Model 761L manufactured by J. W. Greer Inc. of Hudson, N.H.) for approximately 30 seconds with the rheostat set at 40. The oil mixture was then slowly added to the water mixture over 1 minute in the mixer with the rheostat set at 40. The mixing continued for 2 minutes with the rheostat set at 50, then for 1 minute with the rheostat set at 90 and finally for 1.5 minutes with the rheostat set at 120 to create a final emulsion at a temperature of approximately 140° F. The emulsion could be stored in a glass jar under refrigeration or it could be topically sprayed onto a comestible.

A fine even spray of the composition was applied to the surface of a cheese pastry at a level of less than 2% by weight of the cheese pastry. The pastry, which was approximately a single serving, was placed in a household microwave oven at the high power setting for less than 2 minutes. A pleasant cheese aroma permeated the room after approximately 30 seconds.

EXAMPLE 2

A pizza, spicy italian type aroma composition which is capable of quickly releasing its aroma upon exposure to microwave radiation was produced from the following ingredients:

| Ingredient | Percentage |
| --- | --- |
| Oil Phase | |
| Orville Oil | 12.0 |
| F & F Natural Parmesan Cheese 115270 | 8.0 |
| Water Phase | |
| Water | 52.265 |
| NFDM | 13.0 |
| Garlic Powder | 9.0 |
| McC Natural & Artificial Bread F21606 | 3.0 |
| Salt | 2.0 |
| McC Artificial Tomato WONF F48035 | 0.5 |
| Oil of Oregano | 0.15 |
| Oil of Basil | 0.05 |
| Oil of Fennel | 0.025 |
| Oil of Black Pepper | 0.01 |
| Total | 100.0 |

NOTE:
Orville Oil is manufactured by Orville Redenbacher and it is a popping and topping oil which is a mixture of soybean oil and a butter flavor The composition was prepared in a similar manner as set forth in Example 1. Approximately 2 grams of this microwave aroma composition was topically painted on the edge of a Boboli ® Bread Shell weighing approximately 100 grams. The bread shell was placed on a susceptor board (mfg. by James River Corp., Richmond, Va.) in a household microwave oven on a high setting for 2½ minutes. After approximately 45 seconds a pleasant pizza aroma permeated the surrounding area around the microwave oven.

A similar microwave aroma composition can also be prepared by adding two emulsifiers Dimodan PVK at 0.5% and Panodan 150 at 0.1% and subtracting 0.6% water from the above-identified formula. In this case the aroma composition possessed improved emulsification properties but the aroma production characteristics remained substantially unchanged.

EXAMPLE 3

A microwave aroma-producing composition which produces a typical fried aroma upon exposure to microwave radiation was prepared from the following ingredients:

| Ingredient | Percentage |
| --- | --- |
| Oil Phase | |
| Mazola Corn Oil | 18.7 |
| C & K Natural Tallow 8182698500 | 1.0 |
| Firmenich Artificial Fried Fat 586.212/AH | 0.3 |
| Water Phase | |
| Water | 58.5 |
| NFDM | 12.0 |
| Dextrose | 4.0 |
| Salt | 4.0 |
| Microcrystalline cellulose (FMC - Avicel CL611) | 1.5 |
| Total | 100.0 |

NOTE:
C & K - Crompton & Knowles Corp., Mahwah, New Jersey
Firmenich - Princeton, New Jersey The composition was prepared in a similar manner as set forth in Example 1.

Approximately 2% by weight of this microwave aroma composition was topically applied to french fried potatoes utilizing a fine even spray. The french fries on a susceptor board (mfg. by James River Corp.) were placed in a household microwave oven on a high setting for 2 minutes. After approximately 35 seconds a pleasant deep-fried, french fry potatoey aroma permeated the surrounding area around the microwave oven. The aroma was similar to a "fast-food" french fried potato aroma. As a control, the same quantity of french fried potatoes as above which were not coated with the microwave aroma-producing composition were placed on a susceptor board and heated in the microwave oven. A significantly weaker aroma was generated within the last 15 seconds of microwave heating (after 1 minute, 45 seconds of exposure to microwaves) which was characterized as possessing a baked potato and cardboard aroma.

I claim:

1. A composition for producing an aroma upon exposure to microwave radiation during the cooking and/or reheating of food in a domestic microwave oven comprising:
   (a) food acceptable salts in an amount of from 0.5 to 5% by weight of the composition;
   (b) milk solids in an amount of from 5 to 25% by weight of the composition;
   (c) lipids in an amount of from 5 to 35% by weight of the composition;
   (d) water in an amount of from 30 to 70% by weight of the composition; and
   (e) an effective amount of an aroma source which upon exposure of the composition to microwave radiation will produce an aroma.

2. The composition according to claim 1 wherein the aroma source ranges from 0.25 to 20% by weight of the composition.

3. The composition according to claim 1 wherein the composition comprises food acceptable salts from 2 to 4%; milk solids from 8 to 14%; lipids from 17 to 35% and water from 37 to 67%.

4. The composition of claim 1 wherein the food acceptable salts are selected from the group comprising sodium salts, potassium salts, calcium salts, magnesium salts and combinations thereof.

5. The composition of claim 4 wherein the food acceptable salts are sodium chloride or potassium chloride.

6. The composition according to claim 1 wherein the milk solids are non-fat dry milk, milk sugars, whey solids, caseinates and combinations thereof.

7. The composition according to claim 6 wherein the milk solids are lactose.

8. The composition according to claim 6 wherein the milk solids are non-fat dry milk.

9. The composition according to claim 1 wherein the lipid is an animal fat, vegetable fat, butter, mono, di and triglycerides and combinations thereof.

10. A process for producing an aroma during cooking and/or reheating of food in a domestic microwave oven which comprises:
 (a) forming an emulsion composition by admixing a composition comprising food acceptable salts from 0.5–5% by weight of the composition, milk solids from 5–25% by weight of the composition, lipid from 5–35% by weight of the composition, water from 30–70% by weight of the composition and a sufficient quantity of an aroma source which when exposed in the composition to microwave energy will produce an aroma;
 (b) coating said emulsion composition onto a comestible; and
 (c) subjecting the coated comestible to microwave radiation to produce an aroma within a period of time of less than one minute.

11. The process of claim 10 wherein the period of time is 15 to 30 seconds.

* * * * *